(12) United States Patent
Rahimi et al.

(10) Patent No.: US 11,232,296 B2
(45) Date of Patent: Jan. 25, 2022

(54) ACTION CLASSIFICATION USING DEEP EMBEDDED CLUSTERING

(71) Applicant: HRL Laboratories, LLC, Malibu, CA (US)

(72) Inventors: Amir M. Rahimi, Santa Monica, CA (US); Heiko Hoffmann, Simi Valley, CA (US); Hyukseong Kwon, Thousand Oaks, CA (US)

(73) Assignee: HRL Laboratories, LLC, Malibu, CA (US)

( * ) Notice: Subject to any disclaimer, the term of this patent is extended or adjusted under 35 U.S.C. 154(b) by 22 days.

(21) Appl. No.: 15/931,258

(22) Filed: May 13, 2020

(65) Prior Publication Data

US 2021/0012100 A1 Jan. 14, 2021

Related U.S. Application Data

(60) Provisional application No. 62/872,630, filed on Jul. 10, 2019.

(51) Int. Cl.
*G06K 9/00* (2006.01)
*G05D 1/00* (2006.01)
(Continued)

(52) U.S. Cl.
CPC ....... *G06K 9/00369* (2013.01); *G05D 1/0088* (2013.01); *G06K 9/00718* (2013.01);
(Continued)

(58) Field of Classification Search
CPC .......... G06K 9/00369; G06K 9/00718; G06K 9/622; G06K 9/6256; G06K 9/6248;
(Continued)

(56) References Cited

U.S. PATENT DOCUMENTS 10,839,009 B2 * 11/2020 Chen ..................... G06F 16/783
2016/0125243 A1 * 5/2016 Arata ................. G06K 9/00362
382/103

(Continued)

FOREIGN PATENT DOCUMENTS

DE 102017216000 A1 3/2019

OTHER PUBLICATIONS

Sung, Jaeyong, Ponce et al. "Unstructured Human Activity Detection from RGBD Images", Robotics and Automation (ICRA), pp. 842-849, 2012 IEEE International Conference.
(Continued)

*Primary Examiner* — Charlotte M Baker
(74) *Attorney, Agent, or Firm* — Tope-McKay & Associates

(57) ABSTRACT

Described is a system for action recognition through application of deep embedded clustering. For each image frame of an input video, the system computes skeletal joint-based pose features representing an action of a human in the image frame. Non-linear mapping of the pose features into an embedded action space is performed. Temporal classification of the action is performed and a set of categorical gesture-based labels is obtained. The set of categorical gesture-based labels is used to control movement of a machine.

20 Claims, 11 Drawing Sheets

(51) Int. Cl.
 *G06K 9/62* (2006.01)
 *G06N 3/04* (2006.01)
(52) U.S. Cl.
 CPC .......... *G06K 9/622* (2013.01); *G06K 9/6256* (2013.01); *G06N 3/0445* (2013.01)
(58) Field of Classification Search
 CPC ............. G06K 9/00355; G05D 1/0088; G06N 3/0445; G06F 3/017
 USPC .................................................. 382/104, 103
 See application file for complete search history.

(56) References Cited

U.S. PATENT DOCUMENTS

| | | | | |
|---|---|---|---|---|
| 2019/0138607 | A1* | 5/2019 | Zhang | G06K 9/00355 |
| 2020/0394499 | A1* | 12/2020 | Yao | G06N 5/022 |
| 2021/0015415 | A1* | 1/2021 | Ofir | A61B 5/165 |

OTHER PUBLICATIONS

Evangelidis, Georgios et al. "Skeletal Quads: Human Action Recognition Using Joint Quadruples", Pattern Recognition (ICPR), pp. 4513-4518, 2014 22nd International Conference, IEEE.

Ofli, Ferda, et al. "Sequence of the Most Informative Joints (SMIJ): A New Representation for Human Skeletal Action Recognition." Journal of Visual Communication and Image Representation 25.1 (2014): pp. 24-38.

Yang, Xiaodong et al. "Effective 3D Action Recognition Using Eigenjoints", Journal of Visual Communication and Image Representation, pp. 2-11, 2014.

Xia, Lu, et al. "View Invariant Human Action Recognition Using Histograms of 3D Joints", Computer Vision and Pattern Recognition Workshops (CVPRW), pp. 20-27, 2012 IEEE Computer Society Conference.

Wang, Jiang, et al. "Mining Actionlet Ensemble for Action Recognition with Depth Cameras", Computer Vision and Pattern Recognition (CVPR), pp. 1290-1297, 2012 IEEE Conference.

Wang, Jiang, et al. "Robust 3D Action Recognition with Random Occupancy Patterns", Computer vision—ECCV, pp. 872-885, 2012.

Yang, Xiaodong, et al. "Recognizing Actions Using Depth Motion Maps-Based Histograms of Oriented Gradients", Proceedings of the 20th ACM International Conference on Multimedia, pp. 1057-1060, 2012.

Xie, Junyuan, et al. "Unsupervised Deep Embedding for Clustering Analysis", International Conference on Machine Learning, pp. 1-10, 2016.

Liu, An-An, et al. "Hierarchical Clustering Multi-Task Learning for joint human action grouping and recognition", IEEE Transactions on Pattern Analysis and Machine Intelligence, pp. 102-114, 2017.

Cao, Zhe, et al. "Realtime Multi-Person 2D Pose Estimation Using Part Affinity Fields." Proceedings of the IEEE Conference on Computer Vision and Pattern Recognition, pp. 1302-1310, 2017.

Notification of Transmittal and The International Search Report, and the Written Opinion of the International Searching Authority for PCT/US2020/032701; dated Sep. 2, 2020.

Sijie Song et al: "An End-to-End Spatio-Temporal Attention Model for Human Action Recognition from Skeleton Data", arxiv.org, Cornell University Library, 201 Olin Library Cornell University Ithaca, NY 14853, Nov. 18, 2016 (Nov. 18, 2016), XP080733001, the whole document.

Chalodhorn R et al: "Using eigenposes for lossless periodic human motion imitation", Intelligent Robots and Systems, 2009. IROS 2009. IEEE/RSJ International Conference On, IEEE, Piscataway, NJ, USA, Oct. 10, 2009 (Oct. 10, 2009), pp. 2502-2509, XP031580751, ISBN: 978-1-4244-3803-7 the whole document.

Notification of and the International Preliminary Report On Patentability Chapter II for PCT/US2020/032701; dated May 6, 2021.

\* cited by examiner

ACTION CLASSIFICATION USING DEEP EMBEDDED CLUSTERING

CROSS-REFERENCE TO RELATED APPLICATIONS

The present application is a Non-Provisional Application of U.S. Provisional Application No. 62/872,630, filed in the United States on Jul. 10, 2019, entitled, "Action Classification Using Deep Embedded Clustering," the entirety of which is incorporated herein by reference.

BACKGROUND OF INVENTION

(1) Field of Invention

The present invention relates to a system for action recognition, and more particularly, to a system for action recognition through application of deep embedded clustering.

(2) Description of Related Art

Current unsupervised action recognition techniques rely on clustering techniques either in image space or in the pose space. Action recognition techniques can be divided into two categories: image-based and skeletal joint-based. In the image-based techniques the input features are computed from the visual appearance of the tracked person, whereas in skeletal joint-based techniques the input feature is the joint constellation (either two-dimensional (2D) or three-dimensional (3D)) of joint locations (see Literature Reference Nos. 1-5 of the List of Incorporated Literature References).

In Literature Reference No. 3, Ofli et al. defined each action with a sequence of most informative joints which captures the invariances in different human actions. At each instance, they prune down the total number of joints into a smaller yet informative subset based on the mean and variance of joint angle trajectories for each action. Given the angular velocity between the joints, they apply Support Vector Machine (SVM) and K-Nearest Neighborhood (KNN) to classify the actions.

Evangelidis et al. defined an action descriptor that encodes the relative joint positions (see Literature Reference No. 2). After obtaining the view-invariant skeletal representation, they use fisher vector to encode the features and applied SVM classifier to classify the actions. In addition to joint positions, Sung et al. considered the motion, hand position, and appearance features when applying a hierarchical Maximum Entropy Markov Model to representing actions (see Literature Reference No. 1). They perform inference on a two-layer graph using a dynamic programming approach.

Yang et al. (in Literature Reference No. 4) came up with a new action descriptor based on the differences between joint positions within and across video frames to define an eigen-joints feature followed by a non-parametric Naive Bayes Nearest Neighbor classifier to discriminate between action. Wang et al. combined the joint locations with the depth data and constructed an actionlet ensemble model to capture the relationship between body parts and the environment (see Literature Reference No. 6). Wang et al. tackled the noise and occlusion problem in action recognition (see Literature Reference No. 7). They introduced a feature based on Random Occupancy Pattern (ROP) and used sparse coding to robust encoding.

In Literature Reference No. 5, Xia et al. represent posture with the histogram of 3D joint location from the action depth sequences. They then project these features using Linear Discriminant Analysis (LDA) and cluster them into k posture visual words. They then use Hidden Markov Model (HMM) to model the temporal dependencies of these visual words. The novelty of their technique was in the use of a spherical coordinate system which made their technique view-invariant. In Literature Reference No. 8, Yang et al. projected the depth map onto three orthogonal planes and used Histogram of Gaussian (HOG) features to represent actions. In Literature Reference No. 10, Liu et al. proposed a joint action grouping/modeling and defined a non-convex optimization problem with two subtasks; multi-task learning and task relatedness discovery. In Literature Reference No. 9, Xie et al. proposed a nonlinear mapping of the data such that the actions in embedded space are highly separable. Vision-based action recognitions suffer from modeling non-informative signals, such as background or insufficient pose information. They are also vulnerable to partial occlusion of body parts.

Thus, a continuing need exists for a method that improves action recognition performance by mapping pose features into an embedded action space where action patterns are more distinguishable.

SUMMARY OF INVENTION

The present invention relates to a system for action recognition, and more particularly, to a system for action recognition through application of deep embedded clustering. The system comprises one or more processors and a non-transitory computer-readable medium having executable instructions encoded thereon such that when executed, the one or more processors perform multiple operations. For each image frame of an input video, the system computes skeletal joint-based pose features representing an action of a human in the image frame. Non-linear mapping of the pose features into an embedded action space is performed. Temporal classification of the action is performed, and a set of categorical gesture-based labels is obtained. Movement of a machine is controlled based on the set of categorical gesture-based labels.

In another aspect, the pose estimation technique is a Part Affinity Fields (PAF) feature generation technique.

In another aspect, the embedded action space is a recurrent neural network (RNN) framework.

In another aspect, the RNN framework comprises a first recurrent layer that encodes first-order dependencies between a set of joint positions for modeling of the action; and a second recurrent layer that encodes higher-order dependencies between the set of joint positions.

In another aspect, temporal classification is performed using long short-term memory (LSTM).

In another aspect, non-linear mapping is performed using deep embedded clustering in the RNN framework.

In another aspect, the machine is an autonomous vehicle.

In another aspect, the action of the human in the image frame comprises hand gestures of a human directing traffic in a traffic environment, and the set of categorical gesture-based labels is based on the hand gestures of the human directing traffic, and the system controls navigation of the autonomous vehicle through the traffic environment.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
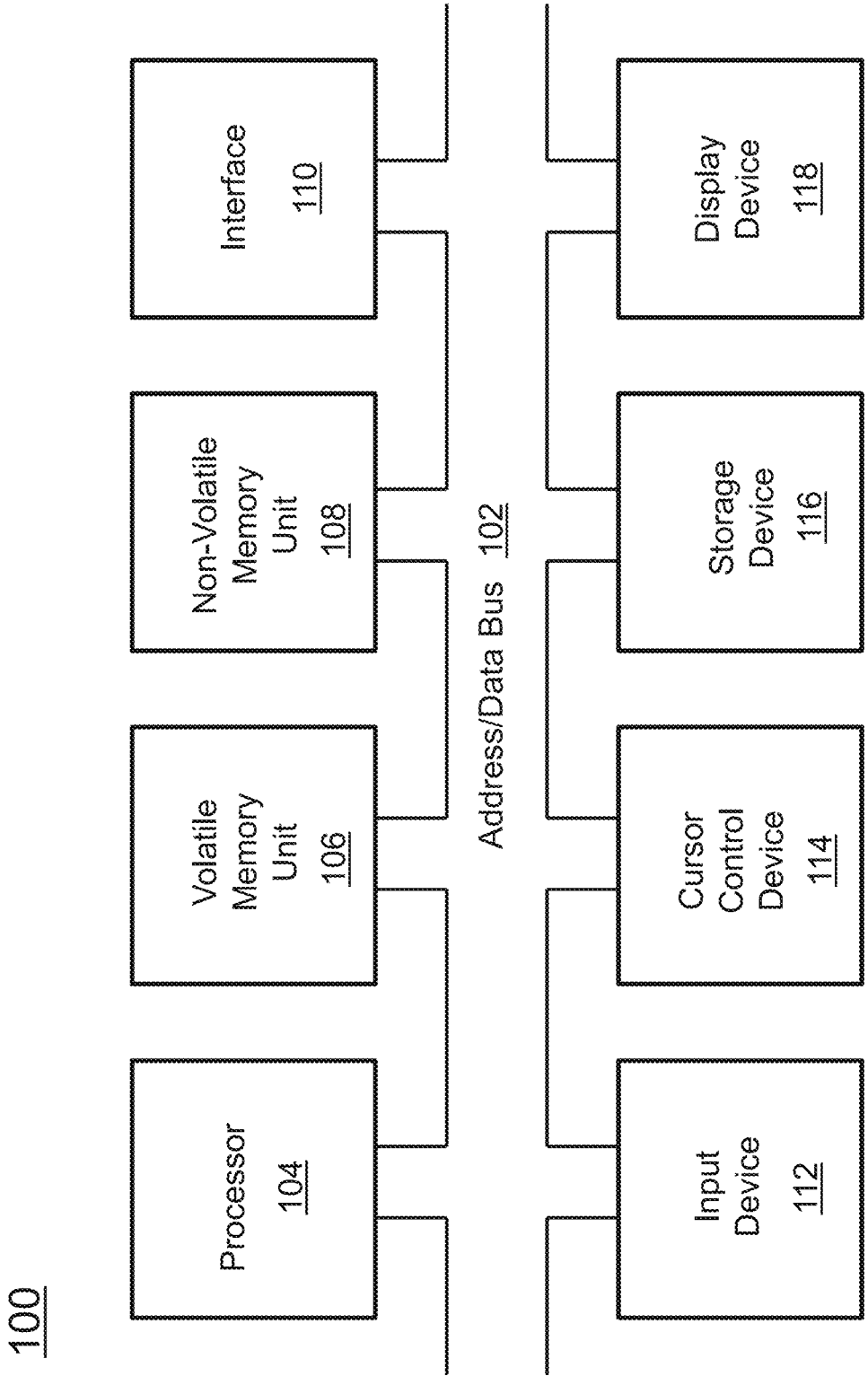
FIG. 1 is a block diagram depicting the components of a system for action recognition according to some embodiments of the present disclosure.

The present invention relates to a system for action recognition, and more particularly, to a system for action recognition through application of deep embedded clustering. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a description of the various principal aspects of the present invention is provided. Finally, specific details of various embodiment of the present invention are provided to give an understanding of the specific aspects.

(1) List of Incorporated Literature References

The following references are cited and incorporated throughout this application. For clarity and convenience, the references are listed herein as a central resource for the reader. The following references are hereby incorporated by reference as though fully set forth herein. The references are cited in the application by referring to the corresponding literature reference number, as follows:

1. Sung, Jaeyong, et al. "Unstructured Human Activity Detection from RGBD Images", Robotics and Automation (ICRA), 2012 IEEE International Conference.
2. Evangelidis, Georgios et al. "Skeletal Quads: Human Action Recognition Using Joint Quadruples", Pattern Recognition (ICPR), 2014 22nd International Conference, IEEE.
3. Ofli, Ferda, et al. "Sequence of the Most Informative Joints (SMIJ): A New Representation for Human Skeletal Action Recognition." Journal of Visual Communication and Image Representation 25.1 (2014): 24-38.
4. Yang, Xiaodong et al. "Effective 3D Action Recognition Using Eigenjoints", Journal of Visual Communication and Image Representation, 2014.
5. Xia, Lu, et al. "View Invariant Human Action Recognition Using Histograms of 3D Joints", Computer Vision and Pattern Recognition Workshops (CVPRW), 2012 IEEE Computer Society Conference.
6. Wang, Jiang, et al. "Mining Actionlet Ensemble for Action Recognition with Depth Cameras", Computer Vision and Pattern Recognition (CVPR), 2012 IEEE Conference.
7. Wang, Jiang, et al. "Robust 3D Action Recognition with Random Occupancy Patterns", Computer vision—ECCV 2012.
8. Yang, Xiaodong, et al. "Recognizing Actions Using Depth Motion Maps-Based Histograms of Oriented Gradients", Proceedings of the 20th ACM International Conference on Multimedia, 2012.

9. Xie, Junyuan, et al. "Unsupervised Deep Embedding for Clustering Analysis", International Conference on Machine Learning, 2016.
10. Liu, An-An, et al. "Hierarchical Clustering Multi-Task Learning for joint human action grouping and recognition", IEEE Transactions on Pattern Analysis and Machine Intelligence, 2017.
11. Cao, Zhe, et al. "Realtime Multi-Person 2D Pose Estimation Using Part Affinity Fields." Proceedings of the IEEE Conference on Computer Vision and Pattern Recognition. 2017.

(2) Principal Aspects

Various embodiments of the invention include three "principal" aspects. The first is a system for action recognition. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 104 In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 104. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
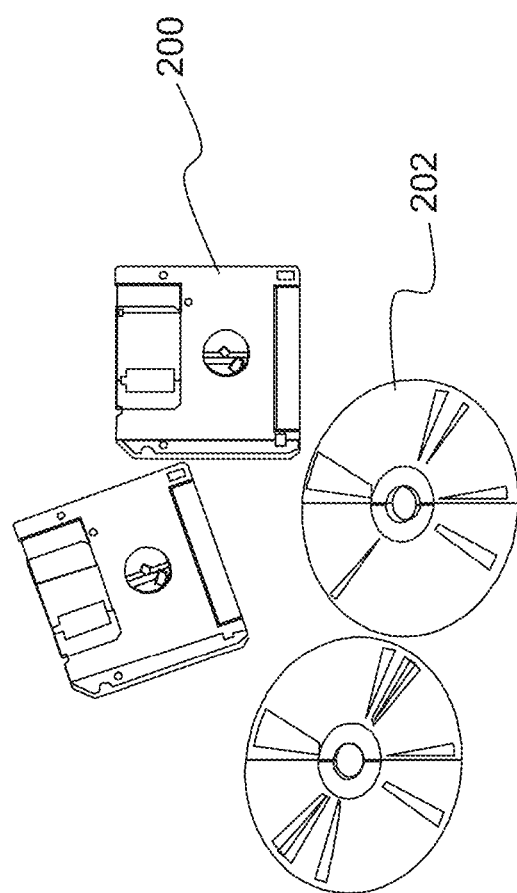
FIG. 2 is an illustration of a computer program product according to some embodiments of the present disclosure.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) Specific Details of Various Embodiments

Action recognition techniques can be divided into two categories: image-based and skeletal joint-based. The invention described herein focuses on the latter category where the locations of joints are available ((either through RGB-D (red, blue, green, depth) data or through some sort of joint estimation technique). The system according to embodiments of the present disclosure provides an improvement in the Long Short-Term Memory (LSTM) framework where skeletal joint-based features are mapped to an embedded space where actions are more separable.

Current unsupervised action recognition techniques rely on clustering techniques either in image space or in the pose space. If one relies solely on visual appearance for action discrimination, many irrelevant features are obtained between actions and, hence, a poor performance in recognizing actions. The system described herein overcomes this challenge by first acquiring a robust pose estimator and, furthermore, applying the Deep Embedded Clustering (DEC) technique, where the pose features are mapped into an embedded action space where action patterns are more distinguishable. With this clustering technique, a LSTM framework is enhanced by feeding the output of stacked LSTM to a DEC layer and enforcing maximum separation in the embedded space. Then, a dense layer is used to predict actions. The present invention demonstrates a performance improvement over a standard data set, as will be described in detail below.

Figure 3:
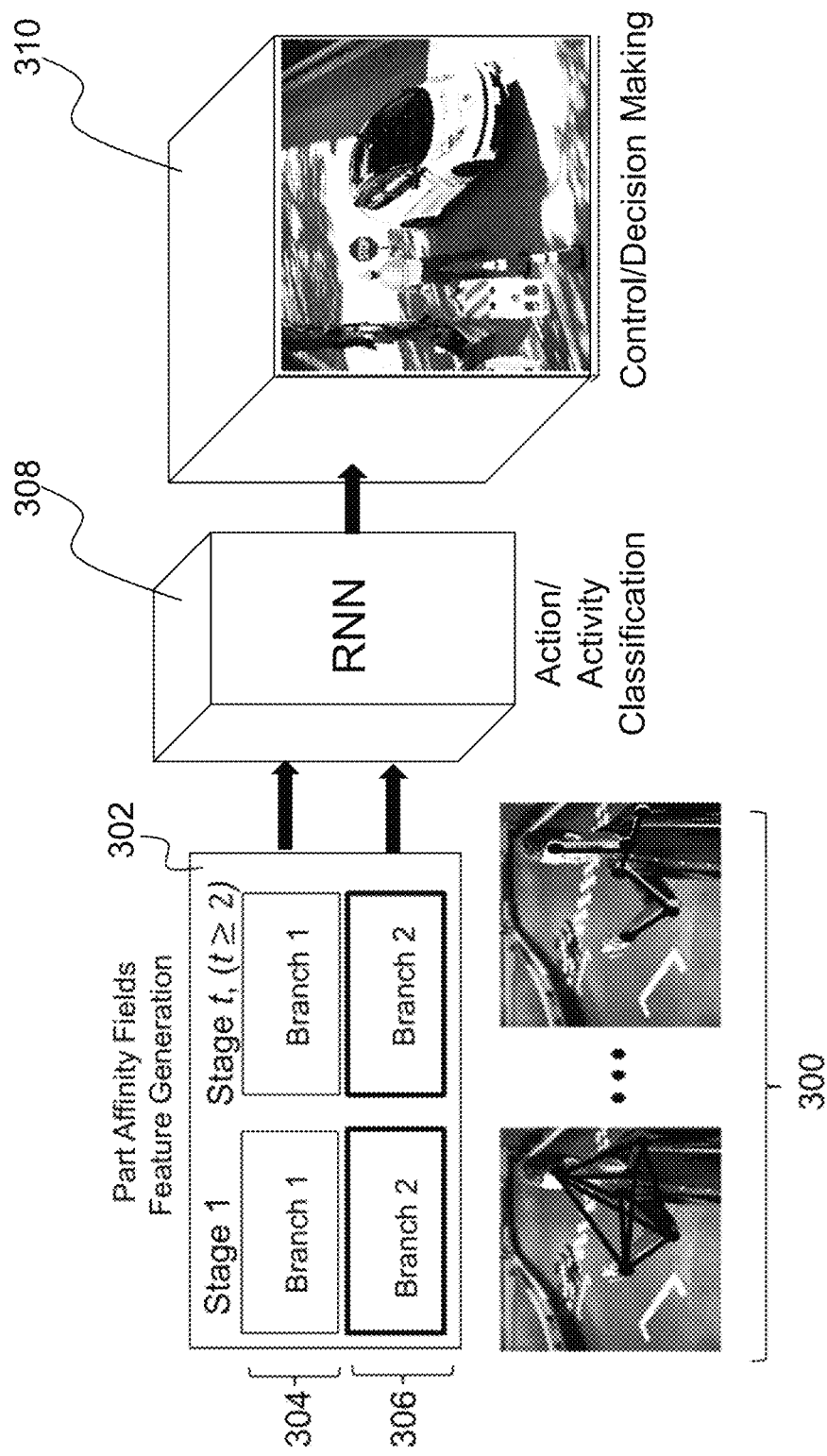
FIG. 3 is an illustration of action representation with Part Affinity Fields (PAF) features and recurrent neural network (RNN) for sequential modeling according to some embodiments of the present disclosure.

The system according to embodiments of the present invention targets any application that involves vision-based human-machine interaction. On this topic, the problem of action recognition is addressed, such that autonomous agents can use the recognized actions to control a particular response. Taking the application of a self-driving car, not only should the vehicle be able to drive safely and autonomously, it should also be able to reliably recognize the traffic officers' instructions as it executes the driving task. To this end, consider a scenario where the input to the system described herein is only the video feed containing a human (or humans) performing a particular action. Below is a description of a sequence of steps which leads to reliable action recognition, which, in turn, enables the machine to follow the instructions given to it. Furthermore, what follows is a description of a method where similar performance can be achieved using only a small data representation. To achieve similar performance as the state-of-the-art action recognition but only using a fraction of information, the innovation according to embodiments of the present disclosure formulates a non-parametric approach known as Part Affinity Fields (PAFs) in a recurrent neural network (RNN) framework. This supervised technique ensures the efficacy of the RNN framework in terms of being able to perform pattern recognition on time series data and discriminate between small numbers of actions. FIG. 3 depicts an overall flow diagram of this task.

Pose estimation (element 300) is the first step in the action classification process described herein, where an accurate and reliable pose estimator is computed. The recently developed PAF feature generation technique (element 302) (see Literature Reference No. 11) considers the expected relationships between body joints to eliminate false positive joint locations in detection. Furthermore, the authors of Literature Reference No. 11 improved the speed of their technique by random sampling of body parts in the image plane and "growing" the connections of remaining body parts. With this technique body joint locations can be reliably detected even if some parts are not fully visible. Note that in each stage of PAF feature generation technique (element 302), there are two branches (e.g., branch 1 (element 304) and branch 2 (element 306)). In short, the first branch (branch 1 (element 304)) is responsible for localizing the likely location of body parts (e.g., left shoulder, right knee), and the second branch (branch 2 (element 306)) is responsible for deriving the vector fields which aids in connection of proper joints (e.g., right shoulder should be connected to right elbow from one side and the neck from the other side). For further details, refer to Literature Reference No. 11. Applying this technique to each image frame, a robust pose information in time can be obtained.

Feature mapping is the next step in the action/activity classification process (element 308), where joint features are mapped to a lower dimensional features space with a constraint that the embedded space is optimized with a clustering objective. When analyzing the movement of skeletal joint locations, there are many actions with a similar joint dynamic, and this makes the job of action recognition non-trivial. The discriminative patterns between actions lie in a different space than the skeletal joint space. Many actions have subtle differences in the skeletal joint feature space (running vs. walking) and, therefore, the classifiers commonly get confused between the two actions. In order to improve the classifiers such that they can distinguish between the subtle differences in joint space, the joint features are mapped to a lower dimensional feature space with a constraint that the embedded space is optimized with clustering objective. This idea is inspired by Xie et al. (see Literature Reference No. 9), where they introduced Deep Embedded Clustering (DEC) to map the data from original feature space to a lower dimensional space using the clustering objective and the deep neural network architecture. Such embedded space typically has a much smaller dimension to avoid the curse of dimensionality. Non-linear mapping is used with deep embedded clustering (DEC) in an RNN framework to reduce the redundancy and increase the discriminative pattern, as described in detail below.

Figure 5:
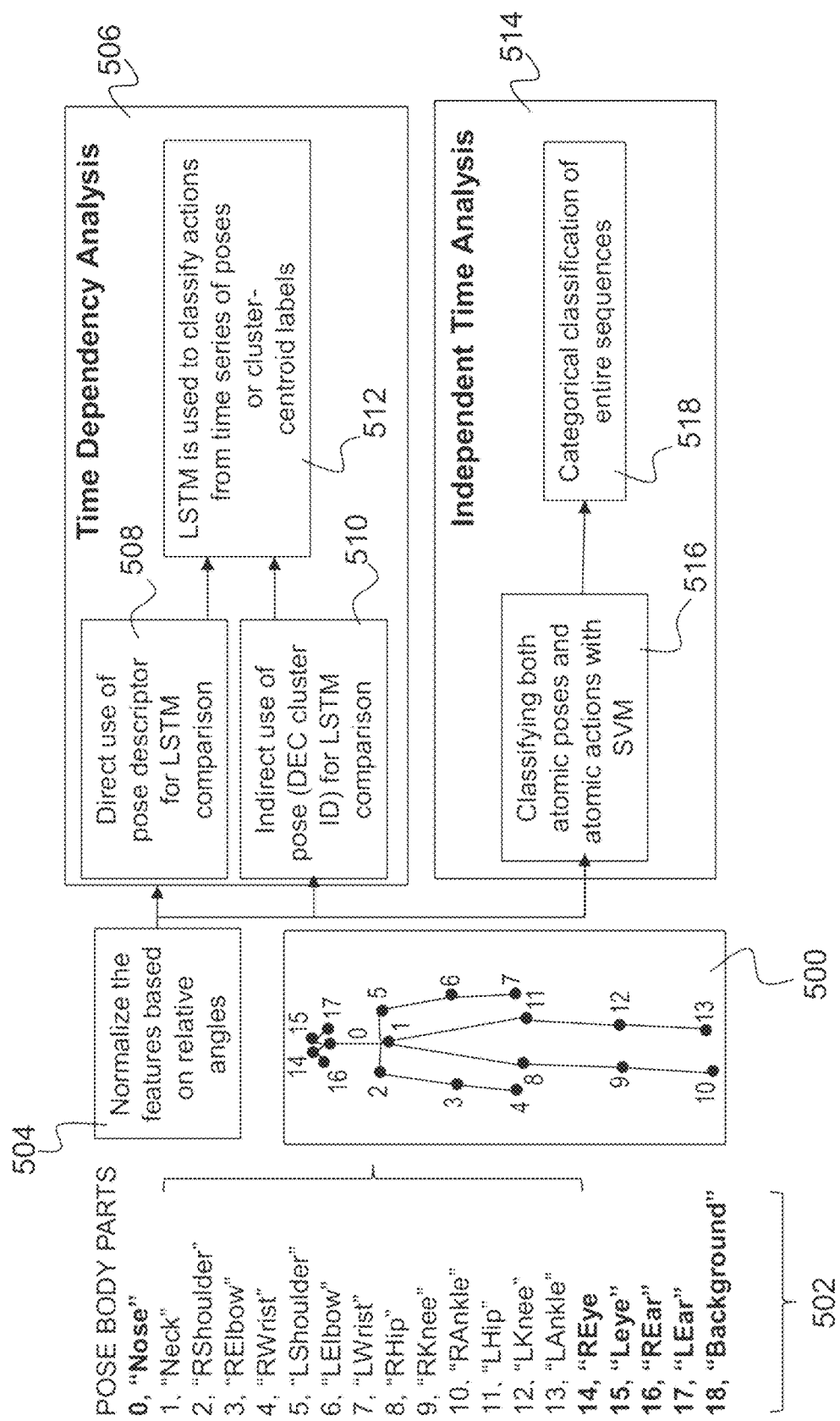
FIG. 5 is an illustration of using Long Short-Term Memory (LSTM) to classify actions from time series of poses or cluster-centroid labels according to some embodiments of the present disclosure.

The third step in the process, as shown in FIG. 3, is temporal modeling (element 308). The invention described herein performs temporal and static classification of actions using LSTM and four "static" classifiers (Decision Tree (DT), support-vector machine (SVM), Bayes, and k-nearest neighbor (KNN)). Given the RNN capability in modeling short-term and long-term contextual information, the temporal modeling of skeletal pose movement is then parameterized with RNN architecture. To this end, an RNN architecture is constructed, where the first recurrent layer encodes first-order dependencies between eleven joint positions for modeling of actions. At this stage the features are simply the angle between three connected joint locations. There are 17 points, and each joint angle requires 3 points (i.e., body parts); therefore, any permutation of 3 out of 17 points is valid. Eleven joint positions were chosen based on intuition. FIG. 5 illustrates the hand selected angles (i.e., the list of pose body parts (element 502)) that are believed to be most informative and relevant (where "hand selected" means that the angles that are most relevant were selected). Higher-order dependencies (e.g., relationships between different angles for a given action) are then encoded with the second recurrent layer for finer modeling of actions.

Figure 9:
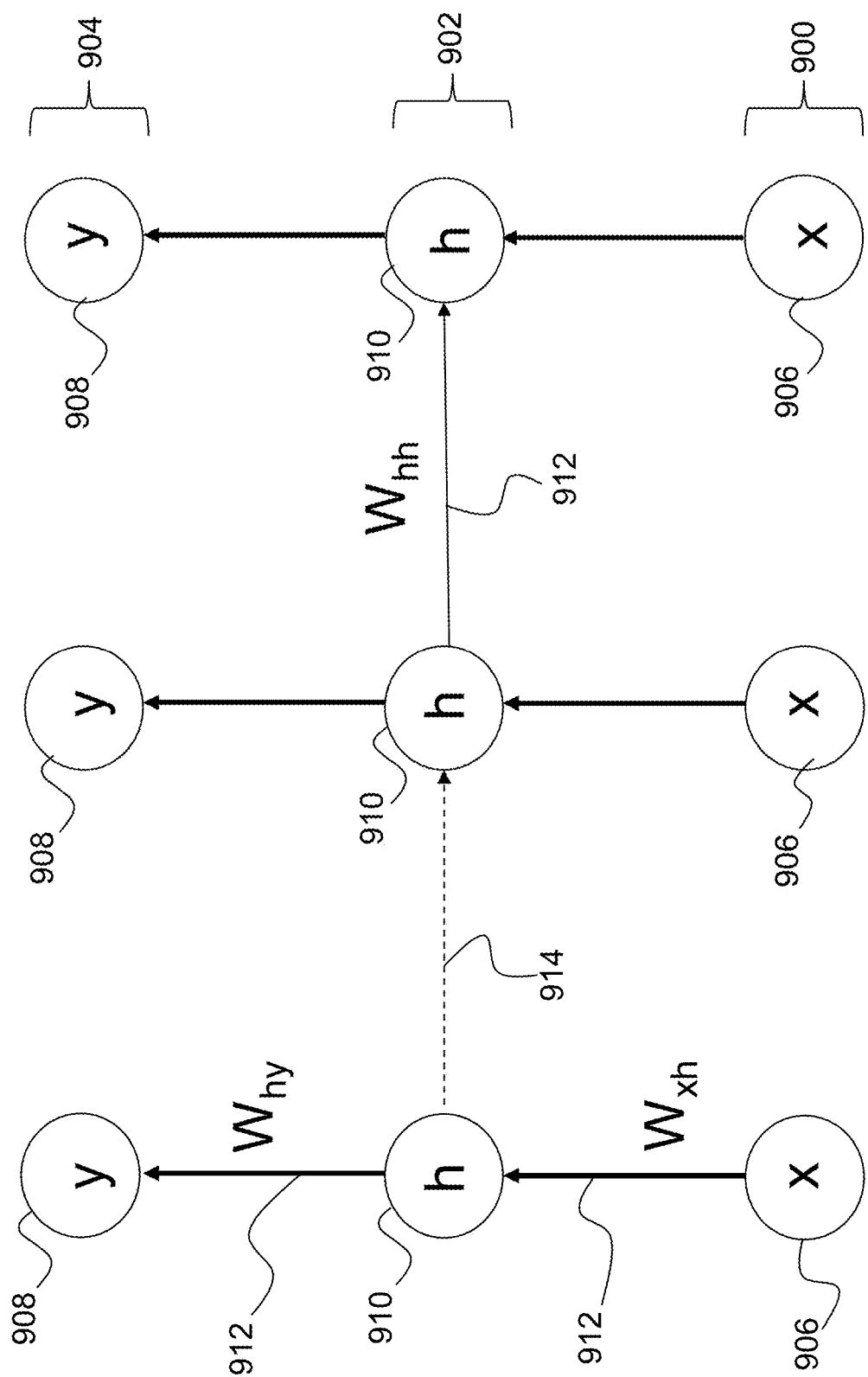
FIG. 9 is an illustration of a RNN architecture according to some embodiments of the present disclosure.

An example RNN architecture is illustrated in FIG. 9, which comprises neuron-like nodes organized into layers, including an input layer (element 900), a hidden layer (element 902), and an output layer (element 904). In this example, X nodes (element 906) in the input layer (element 900) represent the 17 pose features, Y nodes (element 908) in the output layer (element 904) represent the action labels, and H nodes (element 910) in the hidden layer (element 902) modify data en route from the input layer (element 900) to the output layer (element 904). W (element 912) represents the weights of connections between nodes. The dashed arrow (element 914) indicates the temporal aspect of the architecture. For instance, one solid arrow represents one step back in time, and three solid arrows represents three steps back in time. Thus, the dashed arrow (element 914) represents any number of steps back in time.

The DEC technique similar to Literature Reference No. 9 is applied, where the RNN parameters are estimated and the clustering assignment in the embedded space is learned simultaneously. Literature Reference No. 9 introduces a clustering technique, while the technique described herein is applied as part of an action recognition framework. As can be appreciated by one skilled in the art, other clustering methods can be used, and the overall concept would still be valid. The DEC technique described herein is used in the feature mapping step (elements 300, 302, 304, and 306). The main idea is to empower stacked LSTM framework with DEC mechanism such that similar performance can be achieved by using only a fraction of information (i.e., the intermediate embedded layer before fully connected softmax layers intensifies the discriminate patterns between actions). The objective function of RNN is to maximize the inter-cluster variation in the embedded space. In this task, the clustering objective (KL Divergence) is iteratively optimized while the embedded representation is learned, similar to Literature Reference No. 9. In the method described herein, the learning is unsupervised, and the goal is to create a set of "action representations" (e.g., circled numbers (element 700) in FIG. 7) that can later be used to describe a new set of actions.

Figure 4:
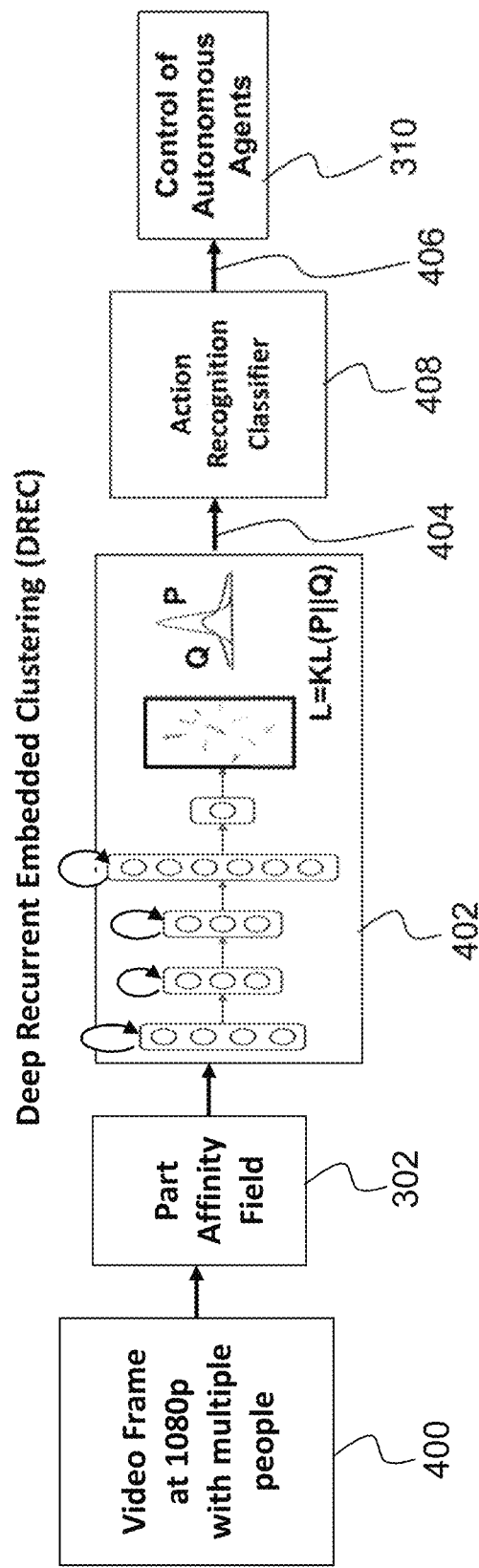
FIG. 4 is an illustration of unsupervised learning of actions with deep recurrent embedded clustering (DREC) according to some embodiments of the present disclosure.

The experimental setup of unsupervised learning of actions with deep recurrent embedded clustering (DREC) is illustrated in FIG. 4. First, videos are collected from, for example YouTube, for each specific action (e.g., video frame at 1080p (where p denotes progressive scan) with multiple people (element 400)). Then, a PAF base feature representation is created (i.e., Part Affinity Field (element 302)). Next, a DREC (element 402) is trained with minimizing the distance between desired distribution and observed distribution. As shown in FIG. 4, where Kullback-Leibler convergence (L) is used to minimize the difference between two distributions of P and Q. The results of DREC (element 404) are used to train with a small set of labeled data from ground-truth of the datasets. The output (element 406) of the action recognition classifier (element 408), which are categorical action labels, are used for high level control of autonomous agents (element 310). A non-limiting example of an agent is a self-driving car (autonomous vehicle) which needs to classify the observed pedestrian actions in order to navigate around the pedestrian. Navigation around the pedestrian may include vehicle maneuvering operations, such as steering, accelerating, decelerating, and/or braking operations which are controlled by mechanical and electrical components of the vehicle. Furthermore, the agent can be an autonomous unmanned air vehicle (UAV) that needs to understand the aircraft marshalling signals (i.e., hand and arm gestures) to take off.

The fourth step in the action classification process is control and decision making (element 310 of FIG. 3). The predicted actions from temporal modeling (element 308) are in the form of categorical gesture-based labels (e.g., "pointing to the left", "stop" or "proceed"). In the control and decision making (element 310) process, the predicted actions are utilized for high-level decision-making process. For instance, in the application of a self-driving car, once the traffic officer is detected, the self-driving car should deviate from its nominal operating behavior to adhere to the officer's instructions. A non-limiting example is a construction zone where a traffic officer instructs a "stop" behavior. In this scenario, the self-driving car's decision maker should trigger the stop behavior by controlling application of a braking mechanism.

Figure 8A:
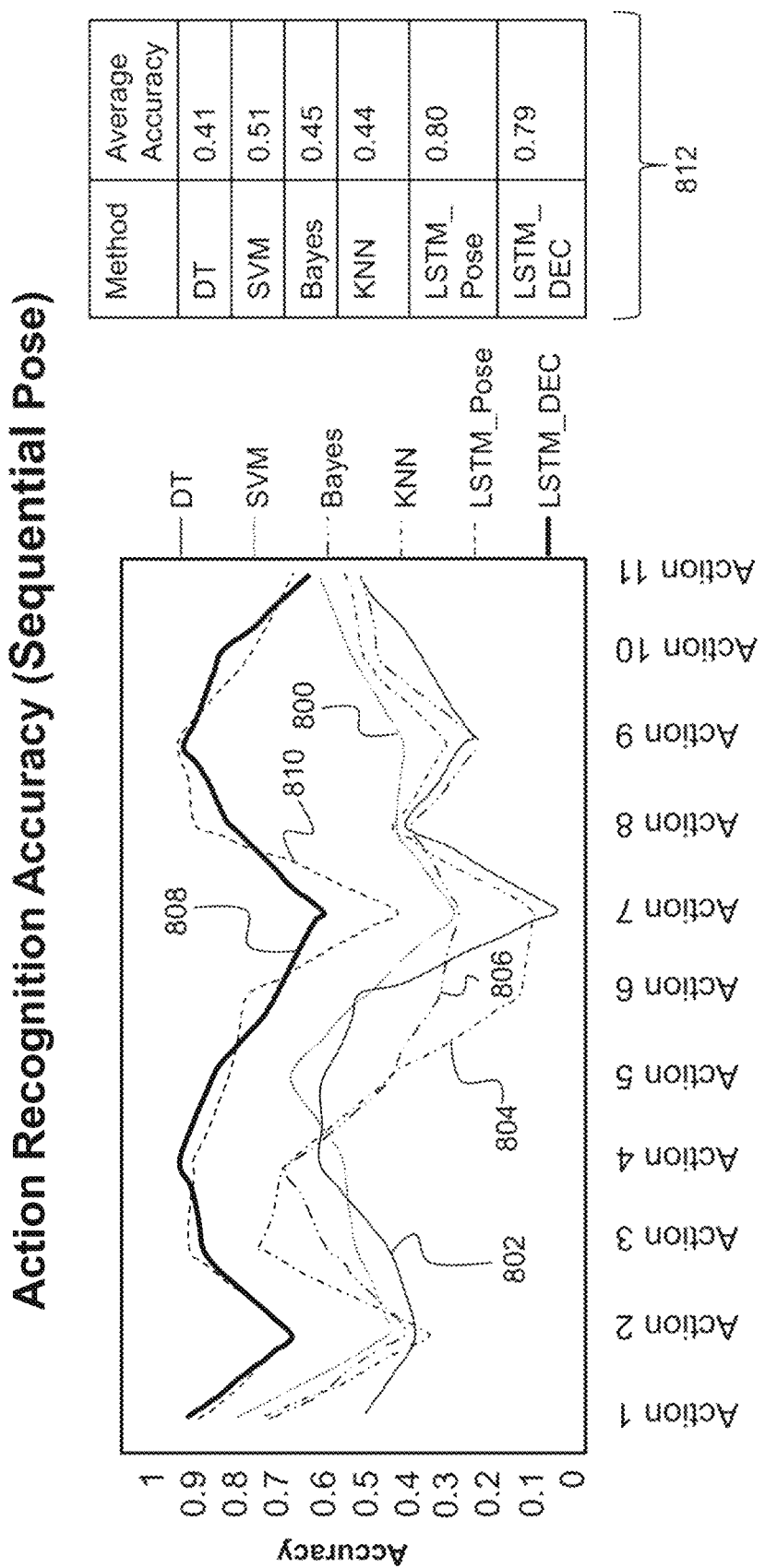
FIG. 8A is a plot illustrating experimental results for action recognition accuracy according to some embodiments of the present disclosure.
Figure 8B:
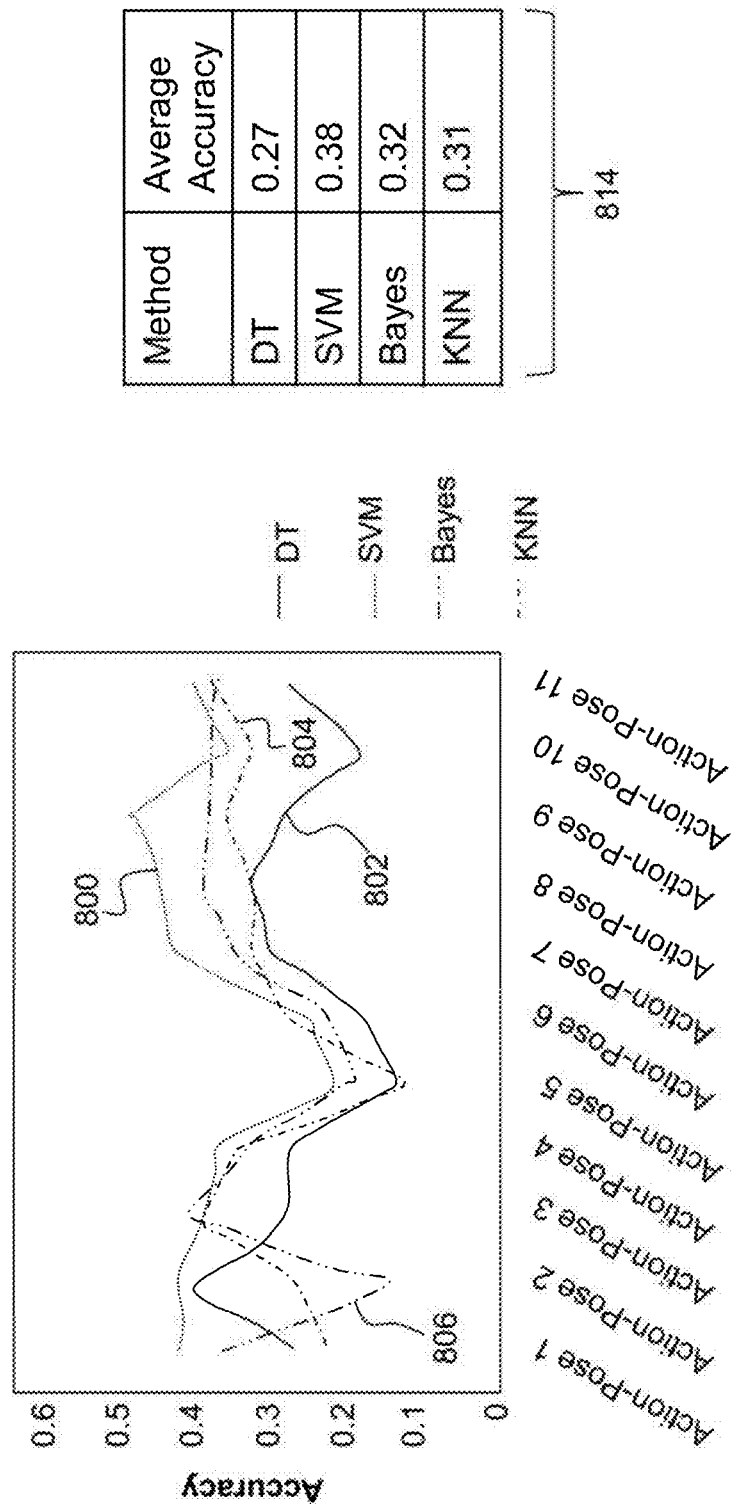
FIG. 8B is a plot illustrating experimental results for accuracy of pose classification into actions according to some embodiments of the present disclosure.

FIG. 5 depicts a joint constellation of joint locations (element 500) created from a list of pose body parts (element 502). The locations of joints are available either through RGB-D data or through a joint estimation technique. Pose constellation features are normalized based on relative angles (element 504). FIG. 5 illustrates both feature extraction (elements 500, 502, and 504) and classification (elements 506 and 514). In a time dependency analysis (element 506) process, a first LSTM is applied directly to the pose constellation features (i.e., direct use of pose descriptor for LSTM comparison (element 508)), and a second LSTM is applied to the DEC cluster IDs (i.e., indirect use of pose (DEC cluster ID) for LSTM comparison (element 510)). A cluster ID is a unique identification given to a cluster. Then, LSTM is used as a temporal classifier to classify actions from time series of poses or cluster-centroid labels (element 512). Note that, with DEC, each pose configuration is mapped to a particular cluster ID, hence, less computationally heavy. In a time-independent analysis (element 514, which is used as a performance comparison for the present invention), the normalized pose constellation features (element 504) are used as input for classifying the poses with SVM (element 516). These analyses are part of the action/activity classification by the RNN (element 308 in FIG. 3), which describe the temporal modeling of pose changes in time. In order to demonstrate the superiority of the temporal features, the features were concatenated, and a time independent feature was created and tested with similar classifiers such as SVM (elements 516, 518). The differences in performance are shown in FIGS. 8A and 8B. In element 516, both atomic poses and atomic actions are classified with SVM. In element 518, categorical classification of entire sequences is performed, where the input features is the entire sequence without any temporal modeling.

The two different LSTM approaches show similar performance. Note that the first LSTM is applied directly to the pose constellation feature, and the second LSTM is applied to the cluster IDs. Despite the minimal differences in the performance (referring to comparison of curves 808 and 810, described below), notice that a single digit (DEC cluster ID) is used to represent each instance of actions compared to full pose feature information. In the two different LSTM approaches, the classifier is the same but the input signal is different. In one experiment, the entire pose information is used (element 508), and in the other the cluster ID's for each pose (which is represented a with a single number) are used (element 510). Thus, similar results can be achieved using a small representation (i.e., single number vs. full pose feature information)

(3.1) Experimental Studies

Figure 6A:
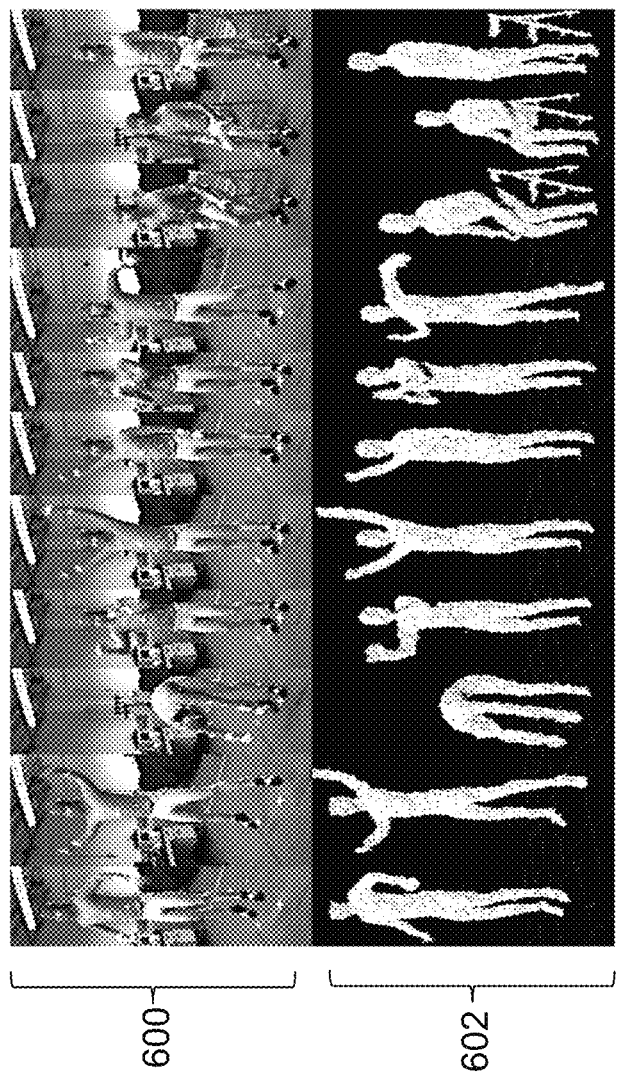
FIG. 6A is an illustration of RGB data with light emitting diodes (LED) markers and a three-dimensional (3D) depth map according to some embodiments of the present disclosure.
Figure 6B:
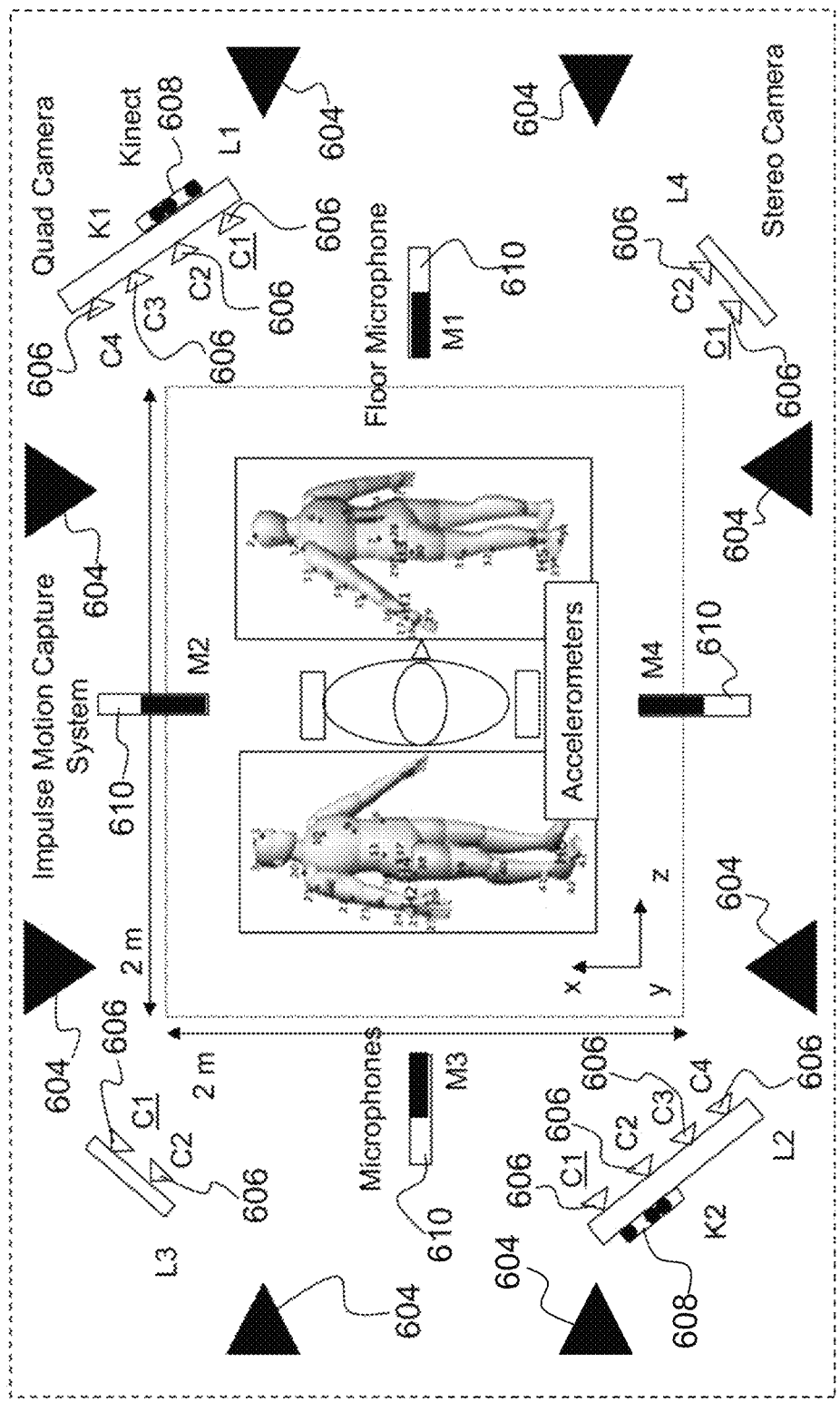
FIG. 6B is an illustration of camera setup for data collection according to some embodiments of the present disclosure.

In order to demonstrate the effectiveness of the method described herein, the method was tested with the Berkeley Multimodal Human Action Dataset (B-MHAD), which has the following specifications: 12 subjects (7 males and 5 females of varying ages) performing 11 actions and 5 repetitions; 12 Dragonfly2 cameras (OEM-style IEEE-1394 board level camera) sampled simultaneously at different angles at 22 Hertz (Hz); a controlled environment with a single human in the camera field-of-view; actions: jumping, jumping jacks, bending, punching, waving two hands, waving one hand, clapping, throwing, sit down/stand up, sit down, stand up; and some inter-subject behavioral variation across actions. FIG. 6A depicts the action types in B-MHAD, and FIG. 6B depicts the camera settings/setup used for data collection. FIG. 6A is an illustration of RGB data with light emitting diode (LED) markers (element 600) and a three-dimensional (3D) depth map (element 602), where a greyscale indicates depth. The LED markers are the reflectors attached to the body of the person in each of the images. In the embodiments illustrated in FIG. 6B, multi-modality sensors include eight optimal motion capture systems represented by filled triangles (element 604), twelve Dragonfly2 cameras indexed by "C" and represented by unfilled triangles (element 606), two Kinect cameras indexed by "K" (element 608), six three-axis accelerometers, and four microphones indexed by "M" (element 610).

Figure 7:
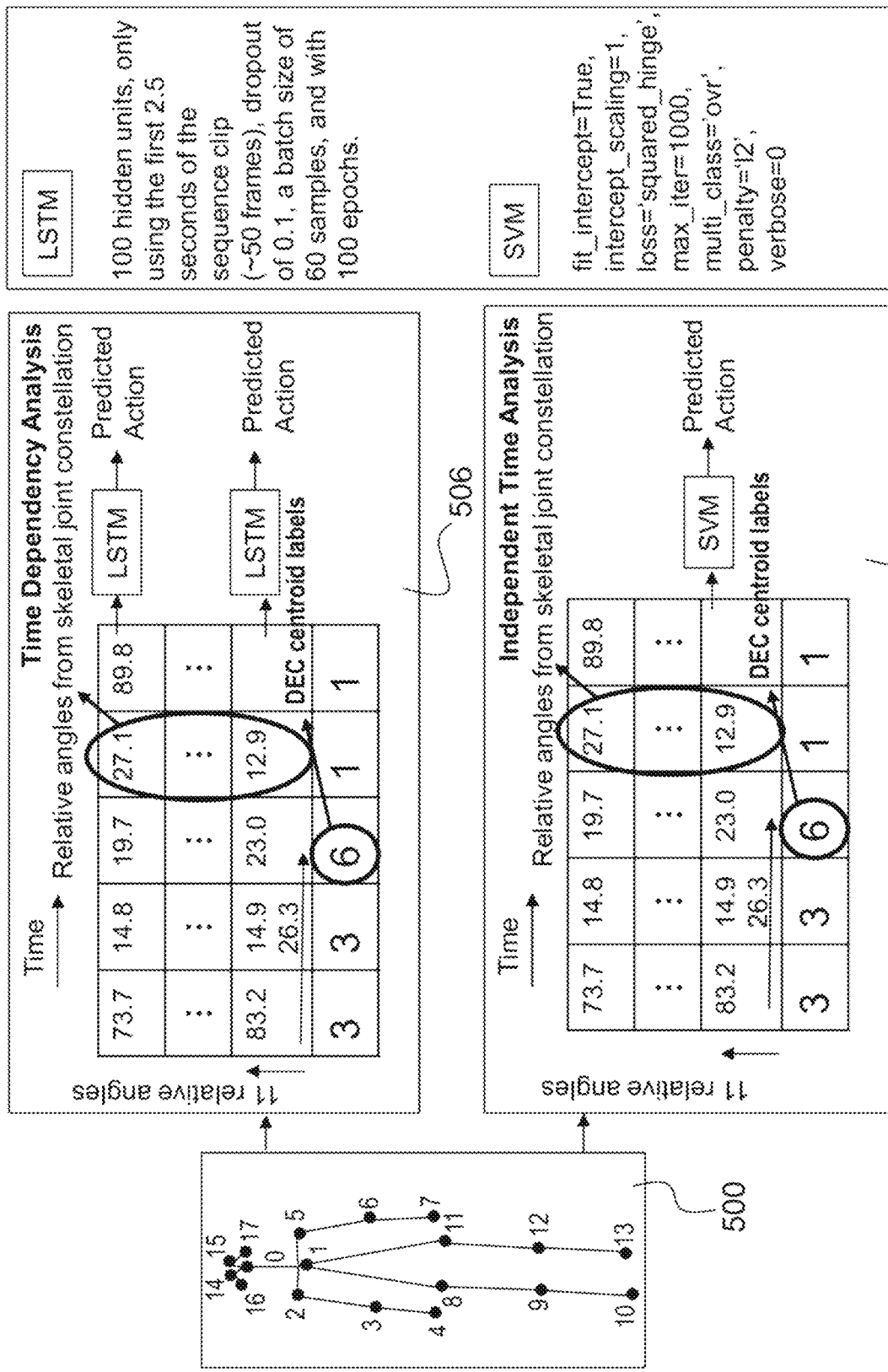
FIG. 7 is an illustration of a test process with LSTM and without LSTM according to some embodiments of the present disclosure.

With the B-MHAD data, action recognition tests are run after extracting 11 relative joint angles in the body (without facial information), as shown in FIG. 7. Tests are run with two different categories: with LSTM (element 506) and without LSTM (element 514). Without the LSTM process (element 514), SVM, DT, KNN, and Bayes methods were applied. In the tests run with the LSTM process (element 506), LSTM was applied to the actual pose information and the DEC information.

FIG. 8A shows accuracy results through the above process, where curve 800 represents the SVM method, curve 802 represents the DT method, curve 804 represents the KNN method, curve 806 represents the Bayes method, curve 808 represents the LSTM_DEC method, and curve 810 represents the LSTM_Pose method. As indicated in the table of average accuracies (element 812), the methods with LSTM (LSTM_DEC and LSTM_Pose) provide better action recognition accuracy (0.79 and 0.80, respectively) than those without LSTM. The two different LSTM approaches (LSTM_DEC and LSTM_Pose) show similar performance. Note that the first LSTM is applied directly to the pose constellation feature (LSTM_Pose), and the second LSTM is applied to the cluster IDs (LSTM_DEC). Despite the minimal differences in the performance, notice that a single digit (DEC cluster ID) is used to represent each instance of actions compared to full pose feature information. In other words, the LSTEM_DEC method may be preferable to the LSTM_Pose method, because LSTM_DEC requires less memory, hence less computing overhead. This comparable performance proves that the DEC clustering technique was able to capture the discriminative patterns between poses that belong to different actions in the embedded space.

FIG. 8B demonstrates the ineffectiveness of action classification without temporal modeling (i.e., without the invention), as shown in the table of average accuracies (element 814). In this evaluation, all the poses that belong to the same label are separated into separate training sets and a linear classifier, such as SVM (curve 800), is applied to recognize the actions.

The invention described herein supports computer vision and machine learning. For example, a robust human gesture recognition can facilitate autonomous cars with human instructions. Using an example of a self-driving vehicle in a construction zone, sensors (e.g., cameras) attached to the vehicle would capture the video signal and, simultaneously, process each frame looking for the construction worker signals in order to navigate in the traffic conditions. Non-limiting examples of operations caused to be performed for navigation of the self-driving vehicle include braking, steering to avoid a collision, decelerating, and accelerating, and others that would be known to one skilled in the art. Each of these operations require coordination of multiple vehicle components, including components used as part of a braking mechanism (e.g., brakes), a steering mechanism (e.g., steering wheel), and an acceleration mechanism (e.g., throttle). For example, if the construction worker (or traffic officer) signals a hand gesture to stop, the system described herein may cause the self-driving vehicle to apply a functional response, such as a braking operation, to stop the self-driving vehicle. Other appropriate responses to other human hand gestures may include one or more of a steering operation, a throttle operation to increase speed or to decrease speed, or a decision to maintain course and speed without change. The responses may be appropriate for avoiding a collision or maintaining safety in the traffic environment.

Additional non-limiting examples of applications include threat detection for security, gesture-based control of machines (e.g., aircraft marshaling, which requires the UAVs to process the observed marshaller instructions through the framework described herein to classify actions, such as "start left engine", "start right engine", "clear to taxi", "clear for take off"). In the application of combat situational awareness (e.g., special weapons and tactics (SWAT)), if there is human-machine collaboration, the machine needs to understand its commanders' signal. In a different application, the action recognition framework according to embodiments of the present disclosure can be used in the active and assisted living (AAL), and healthcare monitoring systems, where the movements of elderly people or patients at the hospital can be monitored to maximize the quality of care.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for action recognition, the system comprising: one or more processors and a non-transitory computer-readable medium having executable instructions encoded thereon such that when executed, the one or more processors perform an operation of:
for each image frame of an input video, computing skeletal joint-based pose features representing an action of a human in the image frame using a pose estimation technique;
performing non-linear mapping of the pose features into an embedded action space;
performing temporal classification of the action and obtaining a set of categorical gesture-based labels; and
controlling movement of a machine based on the set of categorical gesture-based labels.

2. The system as set forth in claim 1, wherein the pose estimation technique is a Part Affinity Fields (PAF) feature generation technique.

3. The system as set forth in claim 1, wherein the embedded action space is a recurrent neural network (RNN) framework.

4. The system as set forth in claim 3, wherein the RNN framework comprises:
a first recurrent layer that encodes first-order dependencies between a set of joint positions for modeling of the action; and
a second recurrent layer that encodes higher-order dependencies between the set of joint positions.

5. The system as set forth in claim 1, wherein temporal classification is performed using long short-term memory (LSTM).

6. The system as set forth in claim 3, wherein non-linear mapping is performed using deep embedded clustering in the RNN framework.

7. A computer implemented method for action recognition, the method comprising an act of:
causing one or more processors to execute instructions encoded on a non-transitory computer-readable medium, such that upon execution, the one or more processors perform operations of:
for each image frame of an input video, computing skeletal joint-based pose features representing an action of a human in the image frame using a pose estimation technique;
performing non-linear mapping of the pose features into an embedded action space;
performing temporal classification of the action and obtaining a set of categorical gesture-based labels; and
controlling movement of a machine based on the set of categorical gesture-based labels.

8. The method as set forth in claim 7, wherein the pose estimation technique is a Part Affinity Fields (PAF) feature generation technique.

9. The method as set forth in claim 7, wherein the embedded action space is a recurrent neural network (RNN) framework.

10. The method as set forth in claim 9, wherein the RNN framework comprises:
a first recurrent layer that encodes first-order dependencies between a set of joint positions for modeling of the action; and
a second recurrent layer that encodes higher-order dependencies between the set of joint positions.

11. The method as set forth in claim 7, wherein temporal classification is performed using long short-term memory (LSTM).

12. The method as set forth in claim 9, wherein non-linear mapping is performed using deep embedded clustering in the RNN framework.

13. A computer program product for action recognition, the computer program product comprising:
computer-readable instructions stored on a non-transitory computer-readable medium that are executable by a computer having one or more processors for causing the processor to perform operations of:
for each image frame of an input video, computing skeletal joint-based pose features representing an action of a human in the image frame using a pose estimation technique;
performing non-linear mapping of the pose features into an embedded action space;
performing temporal classification of the action and obtaining a set of categorical gesture-based labels; and
controlling movement of a machine based on the set of categorical gesture-based labels.

14. The computer program product as set forth in claim 13, wherein the pose estimation technique is a Part Affinity Fields (PAF) feature generation technique.

15. The computer program product as set forth in claim 13, wherein the embedded action space is a recurrent neural network (RNN) framework.

16. The computer program product as set forth in claim 15, wherein the RNN framework comprises:
a first recurrent layer that encodes first-order dependencies between a set of joint positions for modeling of the action; and
a second recurrent layer that encodes higher-order dependencies between the set of joint positions.

17. The computer program product as set forth in claim 13, wherein temporal classification is performed using long short-term memory (LSTM).

18. The computer program product as set forth in claim 15, wherein non-linear mapping is performed using deep embedded clustering in the RNN framework.

19. The system as set forth in claim 1, wherein the machine is an autonomous vehicle.

20. The system as set forth in claim 19, wherein the action of the human in the image frame comprises hand gestures of a human directing traffic in a traffic environment, and wherein the set of categorical gesture-based labels is based on the hand gestures of the human directing traffic, and wherein the one or more processors perform an operation of controlling navigation of the autonomous vehicle through the traffic environment.

* * * * *